(12) United States Patent
Wikholm et al.

(10) Patent No.: US 11,590,491 B2
(45) Date of Patent: Feb. 28, 2023

(54) AUTOMATIC LIQUID TRANSFER OPTIMIZATION PIPETTING APPARATUS AND METHOD

(71) Applicant: FORMULATRIX, INC., Bedford, MA (US)

(72) Inventors: David Wikholm, Bedford, MA (US); Rasmus Lindblom, Bedford, MA (US)

(73) Assignee: FORMULATRIX, INC., Bedford, MA (US)

( * ) Notice: Subject to any disclaimer, the term of this patent is extended or adjusted under 35 U.S.C. 154(b) by 267 days.

(21) Appl. No.: 16/959,020

(22) PCT Filed: Dec. 27, 2018

(86) PCT No.: PCT/US2018/067633
§ 371 (c)(1),
(2) Date: Jun. 29, 2020

(87) PCT Pub. No.: WO2019/133683
PCT Pub. Date: Jul. 4, 2019

(65) Prior Publication Data
US 2020/0330977 A1    Oct. 22, 2020

Related U.S. Application Data

(60) Provisional application No. 62/611,261, filed on Dec. 28, 2017.

(51) Int. Cl.
*B01L 3/02* (2006.01)
(52) U.S. Cl.
CPC .......... *B01L 3/0293* (2013.01); *B01L 3/0275* (2013.01); *B01L 2200/146* (2013.01)

(58) Field of Classification Search
CPC .... B01L 3/0293; B01L 3/0275; B01L 3/0279; B01L 3/0217; B01L 3/021;
(Continued)

(56) References Cited

U.S. PATENT DOCUMENTS

| 7,685,893 B2 | 3/2010 | Champseix et al. |
| 2005/0095723 A1 | 5/2005 | DiTrolio et al. |

(Continued)

FOREIGN PATENT DOCUMENTS

WO    2016166729 A1    10/2016

OTHER PUBLICATIONS

International Search Report and Written Opinion issued in counterpart PCT Application No. PCT/US2018/067633 dated May 1, 2019 (thirteen (13) pages).

*Primary Examiner* — Suman K Nath
(74) *Attorney, Agent, or Firm* — Nexsen Pruet, PLLC; E. Eric Mills; Todd A. Serbin (57) ABSTRACT

An automatic liquid transfer optimization pipetting apparatus and method is disclosed. Namely, a liquid handling apparatus includes a pump supplying a nozzle (i.e., a pipette tip) via a conduit, one or more pressure sensors, and an electronic controller, and wherein the pipette tip is submerged in a liquid. Further, a method of automatic liquid transfer optimization pipetting includes the steps of actuating the pump to move a designated volume of liquid and then allowing the system to settle to a steady state after completion of pump actuation.

19 Claims, 7 Drawing Sheets

(58) Field of Classification Search
CPC .. B01L 3/50825; B01L 9/54; B01L 2200/146; G01N 35/1016; G01N 35/1009; G01N 35/10; G01N 35/02; G01N 35/1079; G01N 35/04; G01N 35/1011; G01N 30/06; G01N 30/20; G01N 30/91; G01N 30/94; G01N 27/44743; G01N 1/10; B01D 15/08

See application file for complete search history.

(56) References Cited

U.S. PATENT DOCUMENTS

| | | | |
|---|---|---|---|
| 2005/0124059 A1* | 6/2005 | Kureshy | G01N 35/1016 435/287.2 |
| 2011/0111506 A1 | 5/2011 | Zuppiger | |
| 2014/0373596 A1* | 12/2014 | Wang | G01F 25/0092 73/1.57 |
| 2018/0298324 A1* | 10/2018 | Takeda | C12N 5/06 |

* cited by examiner

AUTOMATIC LIQUID TRANSFER OPTIMIZATION PIPETTING APPARATUS AND METHOD

CROSS-REFERENCE TO RELATED APPLICATIONS

This application is related to and claims priority under 35 U.S.C. § 119(e) to U.S. Provisional Patent App. No. 62/611,261, entitled "Automatic Liquid Class Pipetting Apparatus and Method," filed on Dec. 28, 2017; the entire disclosure of which is incorporated herein by reference.

TECHNICAL FIELD

The presently disclosed subject matter relates generally to liquid handling methods and more particularly to an automatic liquid transfer optimization pipetting apparatus and method.

BACKGROUND

Automated liquid handling instruments include robots used to transfer specific quantities of liquids, such as reagents or samples, between designated containers. Liquid handling instruments are useful in a variety of applications including cell biology, genomics, forensics, and drug research. The instruments assist humans with the repetitive task of transferring liquids in a wide range of volumes to improve speed and efficiency of the operations, as well as precision and accuracy of the delivered volumes. Examples of commercially available liquid handling instruments include, but are not limited to, the Freedom EVO series by Tecan Trading AG (Männedorf. Switzerland), the Microlab VANTAGE System by Hamilton Company (Reno, Nev.), and the JANUS Workstation series by Perkin Elmer (Waltham, Mass.).

The advantages of automating liquid handling processes include increasing throughput and efficiency of operations and eliminating human errors. The advantages are contingent on the accuracy and repeatability of pipetting operations to ensure the integrity of experimental results in the above mentioned fields.

To achieve good performance, the control parameters of a liquid handling instrument must be tuned for particular types of liquids. Control parameters can be numerous, examples include the rate of pump actuation, volume to be actuated by the pump, depth of probe immersion in the liquid, delay of probe removal from the liquid, and speed of probe removal from the liquid.

A liquid handling instrument can have a default set of control parameters, which is useful for pipetting water or aqueous solutions that have very similar properties to water. However, if the instrument is to be used with a liquid that has substantially different properties compared with aqueous solutions, the control parameters must be calibrated and tuned to ensure accurate and precise pipetting of such a liquid. Calibration of new control parameters is a complex and time consuming process and is typically performed by a specialist. Moreover, the user of the instrument is required to explicitly specify the set of control parameters associated with the liquid to be pipetted at the time an automated pipetting protocol is authored. If the control parameters are selected incorrectly, the accuracy and precision of the resulting pipetting operation can fail to meet the required specification.

These requirements stand as a barrier to the use of advanced liquid handling instruments for the average lab worker. Namely, calibration of new control parameters for a particular liquid requires time and special training. Further, programming of liquid handling operations requires training and experience. Thus, there is a need to simplify the user experience of automated liquid handling instruments with respect to the determination and selection of control parameters.

Relevant patents to this background include the following:

U.S. Pat. No. 8,357,544, entitled "Method for selecting pipetting parameters for a liquid." The '544 patent describes a liquid-based liquid handler wherein the liquid handler can measure pressure throughout an aspiration and create a pressure curve from the measurements. Other aspects of the '544 patent include comparing the measured pressure curve to known pressure curves, and determining dispense pipetting parameters (e.g., plunger speed, etc.) based on the comparison of the measured pressure curve to known pressure curves.

U.S. Pat. No. 7,694,591, entitled "Method and apparatus for evaluating a dosing operation." The '591 patent describes a syringe and air-based liquid handler that can monitor pressure throughout aspiration/dispensing, detect errors if the signal differs from a known and expected values, and identify certain errors.

U.S. Pat. No. 6,938,504, entitled "Method and device for evaluating a liquid dosing process." The '504 patent describes an example of monitoring pressure throughout the aspiration or dispensation, and comparing it to a predetermined set point range for that liquid and set of control parameters in order to evaluate for errors.

U.S. Pat. No. 6,662,122, entitled "Method for the controlled proportioning of liquids while dislocating a gas cushion." The '122 patent describes an example of monitoring pressure and time throughout an aspiration and dispense, and using the known volume of gas within the pipetting system along with parameters of pump actuation to determine the time of a pipetting operation and compare it to an expected time.

U.S. Pat. No. 7,197,948, entitled "Method of dosing liquid volumes and apparatus for the execution of the method." The '948 patent describes a process that includes actuation of the pump during aspiration and wherein dispense is controlled to apply and maintain a particular working pressure. The flow of liquid into the pipette tip is monitored by calculations based on pressure measurements throughout this process. When the desired volume is achieved, the pump is actuated to abate this working pressure. Dispense parameters are determined based on the results of the aspiration.

U.S. Pat. No. 8,096,197, entitled "Air displacement liquid delivery system and related method." The '197 patent describes a process of monitoring pressure inside and outside the pipette tip to improve the speed of viscous pipetting by moving the plunger beyond the set point to maintain a greater flow rate, then moving it back to the set point. Also, the '197 patent describes monitoring the volume of liquid in the tip over time based on pressures.

U.S. Pat. No. 7,634,367, entitled "Estimating fluidic properties and using them to improve the precision/accuracy of metered fluids and to improve the sensitivity/specificity in detecting failure modes." The '367 patent describes a process of monitoring pressure during aspiration and extracting features from the sensed data to estimate viscosity. The '367 patent is based on determined viscosity, and adjusting control parameters to improve accuracy/precision. Calibration curves are created with different fluids of known viscosity. Unknown fluid viscosity can be found by fitting the pressure curve/features of the pressure curve to those of known viscosities. The amount of volume needed relative to aspiration and extracting steps can be corrected based on the detected viscosity.

U.S. Pat. No. 8,307,697, entitled "Method for estimating viscosity." The '697 patent describes a specific method of estimating viscosity during aspiration. The method involves comparing the pressure change from just before aspiration (ambient) and immediately after plunger movement to pressure change between immediately after plunger movement and some fixed time after plunger movement. Specifically, the '697 patent measures the rate of pressure change during plunger movement, and the rate of pressure change after plunger movement. The '697 patent further measures pressure a fixed amount of time after the plunger stops moving. Based on the measurements and calculations, viscosity is estimated based on a calibration of the system. Next, an equation is calibrated to determine the actual viscosity based on these pressure measurements.

SUMMARY

In an aspect, an apparatus for automatic liquid transfer optimization pipetting is disclosed. In some embodiments an apparatus for automatic liquid transfer optimization pipetting comprises a pump; a pipette tip in fluid communication with the pump, the pipette tip comprising a conduit with a working air pressure relative to ambient pressure, the working air pressure having an upper threshold; a pressure sensor connected to the conduit, the pressure sensor being adapted to measure the working air pressure, the ambient pressure, and changes to the working air pressure caused by aspiration or dispensation of a liquid by the pipette tip; and a controller in electrical communication with the pump and the pressure sensor, wherein the controller receives input from the pressure sensor, commands a velocity of the pump, and maintains the working air pressure at or below the upper threshold by adjustment of the velocity of the pump during aspiration or dispensation of a liquid by the pipette tip.

In some embodiments, an apparatus described herein further comprises a frame; and an actuator fixed to the frame and in electrical communication with the controller, the actuator being operatively connected to the pump and the pipette tip and adapted to control movement of the pump, the pipette tip, or both.

A pump described herein can in some cases comprise a motor; and a syringe operatively connected to the motor.

In another aspect, a method of automatic liquid transfer optimization pipetting is disclosed herein. In some embodiments a method of automatic liquid transfer optimization pipetting comprises providing an apparatus for automatic liquid transfer optimization pipetting described herein; aspirating or dispensing a liquid in the conduit of the pipette tip; adjusting a velocity of the pump to limit the working pressure in the conduit of the pipette tip to a pressure level equal to or less than a maximum working pressure value during aspiration or dispensing of the liquid; actuating pump to displace a volume of air in the conduit, the volume of air corresponding to a desired volume of the liquid being aspirated or dispensed. In some embodiments, a method described herein further comprises providing a container holding the liquid, the liquid having unknown physical properties; and inserting the pipette tip into the liquid for aspiration or dispensation. In some instances, a method described herein can further comprise determining a reference pressure in the conduit, the reference pressure being a pressure in the conduit during an absence of any liquid in the conduit. In yet other embodiments, a method described herein can further comprise monitoring pressure within the conduit with the pressure sensor. A reference pressure in some cases is equal to an ambient pressure within the conduit and outside the conduit. In some instances, aspirating or dispensing a liquid comprises actuating the pump.

A method described herein can further comprise the step of filtering the measurements by the pressure sensor by calculating a moving average of the pressure sensor signals. A moving average described herein can be determined by calculating the average of all prior measurements within a period of time.

A controller described herein can adjust the velocity of the pump during actuation in some instances to maintain the working pressure in the conduit at a pressure level equal to or less that the maximum working pressure.

In some embodiments, a method described herein can further comprise confirming a steady state pressure response within the conduit after the pump has been actuated to displace the volume of air in the conduit. In some instances, confirming the steady state pressure response comprises measuring the slope of the pressure response over time. In some cases, the slope is calculated by dividing the difference in pressure before and after a time interval by the duration of the time interval, using the formula:

$$s = \frac{P_n - P_{n-1}}{t_s}$$

wherein s is the slope (time rate of change) of the pressure response, n is the number of time intervals that have passed since the beginning of slope measurement, P is the pressure, and $t_s$ is the slope interval of time.

In some embodiments, a pump described herein can comprise a syringe and a piston, and wherein actuating the pump comprises moving the piston outward from the syringe during an aspiration, and moving the piston into the syringe during a dispensation. The actuating step can be done at a sufficient speed in some cases to create a substantially measureable pressure change within the conduit.

A working pressure described herein, can, after a period of exponential decay of one time constant be calculated as:

$P_\tau = P_1 - 0.4*(P_1 - P_0)$ wherein $P_\tau$ is the working pressure, $P_0$ is the reference pressure, and $P_1$ is the pressure at the end of the piston movement and the beginning of the exponential decay. In some embodiments, a method described herein can comprise the step of continuously monitoring the working pressure as the working pressure decays until the value of the $P_\tau$ is reached.

In some embodiments, termination of a pump actuation is with a deceleration of the velocity of the pump that acts as a step input to create a substantially measurable first-order response to the working pressure.

In some embodiments, a method described herein can further comprise the step of determining parameters to adapt the liquid to the pipetting apparatus. The parameters can be calculated by:

$t_f = c_1 * \tau + c_2$ $t_s = c_3 * \tau + c_4$ $s_0 = c_5 * \tau + c_6$ wherein $t_f$ is filtering moving average time window, $t_s$ is the slope determination time window, $s_0$ is the slope threshold for steady state, and $c_1$, $c_2$, $c_3$, $c_4$, $c_5$, and $c_6$ are empirically determined coefficients specific to a particular pipetting system design.

BRIEF DESCRIPTION OF DRAWINGS

Having thus described the presently disclosed subject matter in general terms, reference will now be made to the accompanying Drawings, which are not necessarily drawn to scale, and wherein:

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter can be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides an automatic liquid transfer optimization pipetting apparatus and method. The presently disclosed automatic liquid transfer optimization apparatus and method is capable of transferring liquids regardless of liquid properties and with no prior knowledge of such liquid properties. The presently disclosed automatic liquid transfer optimization apparatus and method relates to automating certain aspects of liquid transfer operations on automated liquid handling instruments to simplify the user experience of such instruments. As compared with conventional automated liquid handling instruments, the presently disclosed automatic liquid transfer optimization apparatus and method provides a means to reduce or entirely eliminate (1) the need to specify liquid properties when programming an automated liquid handler, and (2) the need to calibrate pipetting parameters for each specific liquid to be processed.

In some embodiments, the presently disclosed automatic liquid transfer optimization pipetting apparatus and method can be used to improve the user experience of automated liquid handling instruments by automating some aspects of pipetting operations that can otherwise be explicitly programmed by the user. For example, the automatic liquid transfer optimization pipetting apparatus and method can be used to bypass meticulous calibration of the pipetting parameters related to various liquid properties such that an automated liquid handling instrument can accurately and precisely carry out a pipetting operation with no prior knowledge of the properties of the liquid to be pipetted.

In the current state of the art, the control parameters of an automated liquid handling instrument must be specifically calibrated for each pipetting operation, depending on the properties of the liquids to be transferred. This is a delicate and time consuming process that must typically be performed by a trained specialist. In addition, after the control parameters for a particular liquid have been calibrated, the user is required to specify the types of liquids used in each step of a pipetting protocol when programming an automated liquid handler. Such inconvenience and complexity could deter the average lab worker from using an automated liquid handler for their pipetting tasks which are normally carried out by hand. Accordingly, in some embodiments, the presently disclosed automatic liquid transfer optimization pipetting apparatus and method can be used to reduce or entirely eliminate these inconveniences and achieve accurate and repeatable pipetting with no prior knowledge of liquid properties. Namely, the automatic liquid transfer optimization pipetting apparatus and method enables automatic real-time adaptation of control parameters to suit whatever liquid the system encounters.

Figure 1:
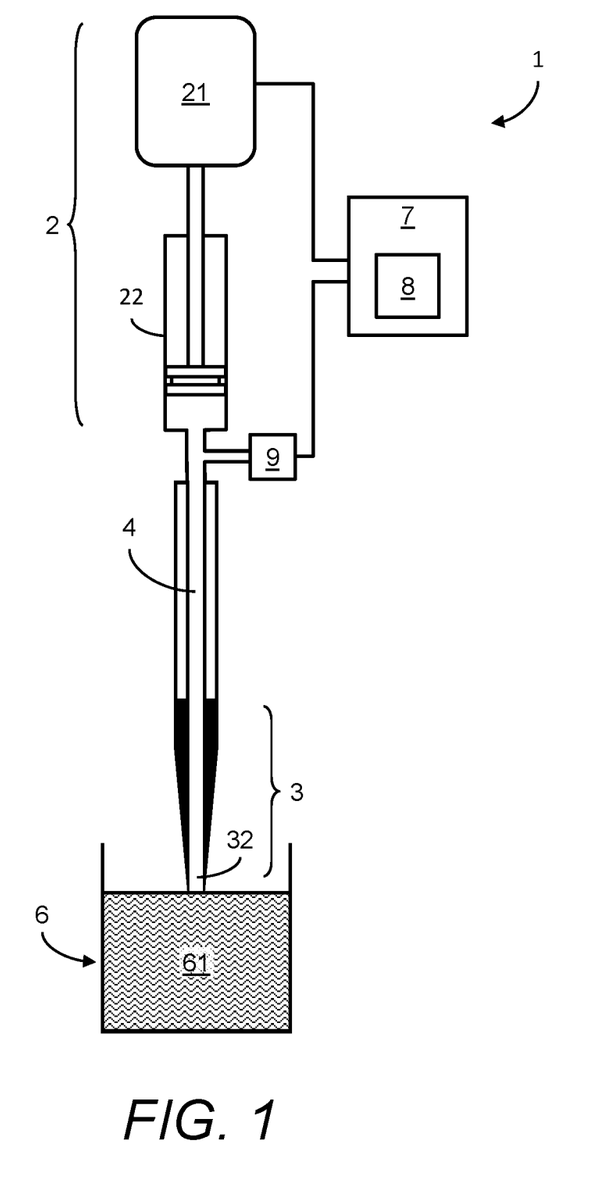
FIG. 1 illustrates a block diagram of an example of a liquid handling apparatus that can be used to perform the presently disclosed automatic liquid transfer optimization pipetting method.

FIG. 1 is a block diagram of an example of a liquid handling apparatus 1 that can be used to perform the presently disclosed automatic liquid transfer optimization pipetting method. The liquid handling apparatus 1 is a pipetting device and is an example of the presently disclosed automatic liquid transfer optimization pipetting apparatus.

The liquid handling apparatus 1 includes a pump 2 in fluidic communication with a nozzle 3 via a conduit 4. The pump 2 is capable of metering specific volumes and can vary in mechanism. In one example, the pump 2 is a syringe pump that includes a syringe 22 that is driven by a motor 21. In one example, the pump 2 can be an air pump producing a regulated source of positive and/or negative (i.e., vacuum) pressure, which along with a flow sensor (not shown) and a valve (not shown) can be used to meter volumes. In one example, the conduit 4 is filled with air. In another example, the conduit 4 can be filled entirely or partially with a system liquid, such as water, which reduces the volume of air between the nozzle 3 and the pump 2.

The nozzle 3 has an orifice 32 through which liquids are taken up into or ejected out of the nozzle 3. In one example, the nozzle 3 can be permanently fixed to the liquid handling apparatus 1. In another example, the nozzle 3 can be a removable nozzle, such as a removable and disposable pipette tip. Accordingly, the nozzle 3 is hereafter referred to as a pipette tip 3. In one example, the liquid handling apparatus 1 includes one or more pressure sensors 9 in the conduit 4. The pressure sensors 9 are used to measure the air and/or liquid pressure in the conduit 4 and/or the pipette tip 3. The liquid handling apparatus 1 further includes an electronic controller 7 that can further include an optimization algorithm 8. The electronic controller 7 and/or the optimization algorithm 8 can be used to process information from the pressure sensors 9 and to control actuation of the pump 2 (e.g., the syringe pump).

Further, a container 6 is provided in relation to the pipette tip 3 of the liquid handling apparatus 1. The container 6 holds a quantity of liquid 61. In the liquid handling apparatus 1, the orifice 32 of the pipette tip 3 is inserted into the liquid 61 so that it can aspirate or dispense the liquid 61.

A collection of control parameters exist that govern the execution of a pipetting operation (e.g. an aspiration or a dispensation) by an automated liquid handling device, such as the liquid handling apparatus 1. Such control parameters can include the rate of pump actuation, the delay between completion of pump actuation and removal of the pipette tip 3 from the liquid 61, and the rate of pipette tip 3 removal from the liquid 61. The control parameters must be modulated and optimized to suit the properties of a particular liquid, in order to ensure repeatable and error-free pipetting of that liquid. Accordingly, in some embodiments, the presently disclosed liquid handling apparatus 1 and method provide analysis of sensor data to adjust the pipetting control parameters in real time in order to maximize pipetting performance with no prior knowledge of the properties of the liquid 61 being pipetted. More specifically, the liquid handling apparatus 1 and method recognize the first-order system response of the air pressure in a pipette tip (e.g., pipette tip 3) during a liquid handling operation in order to ensure error-free aspiration and dispensation, and to predict the time at which the operation will be complete.

The presently disclosed liquid handling apparatus 1 and method can allow detection of certain errors that would indicate a failed pipetting operation. In a laboratory setting, a user with no experience programming a liquid handler for use with particular liquids can easily and intuitively, with minimal training, work with an automated liquid handler on which the algorithms discussed herein have been implemented. Namely, a user with no experience programming a liquid handler for use with particular liquids can easily and intuitively, with minimal training, work with the presently disclosed liquid handling apparatus 1 and method in which the algorithms discussed herein (e.g., optimization algorithm 8) have been implemented.

Figure 2:
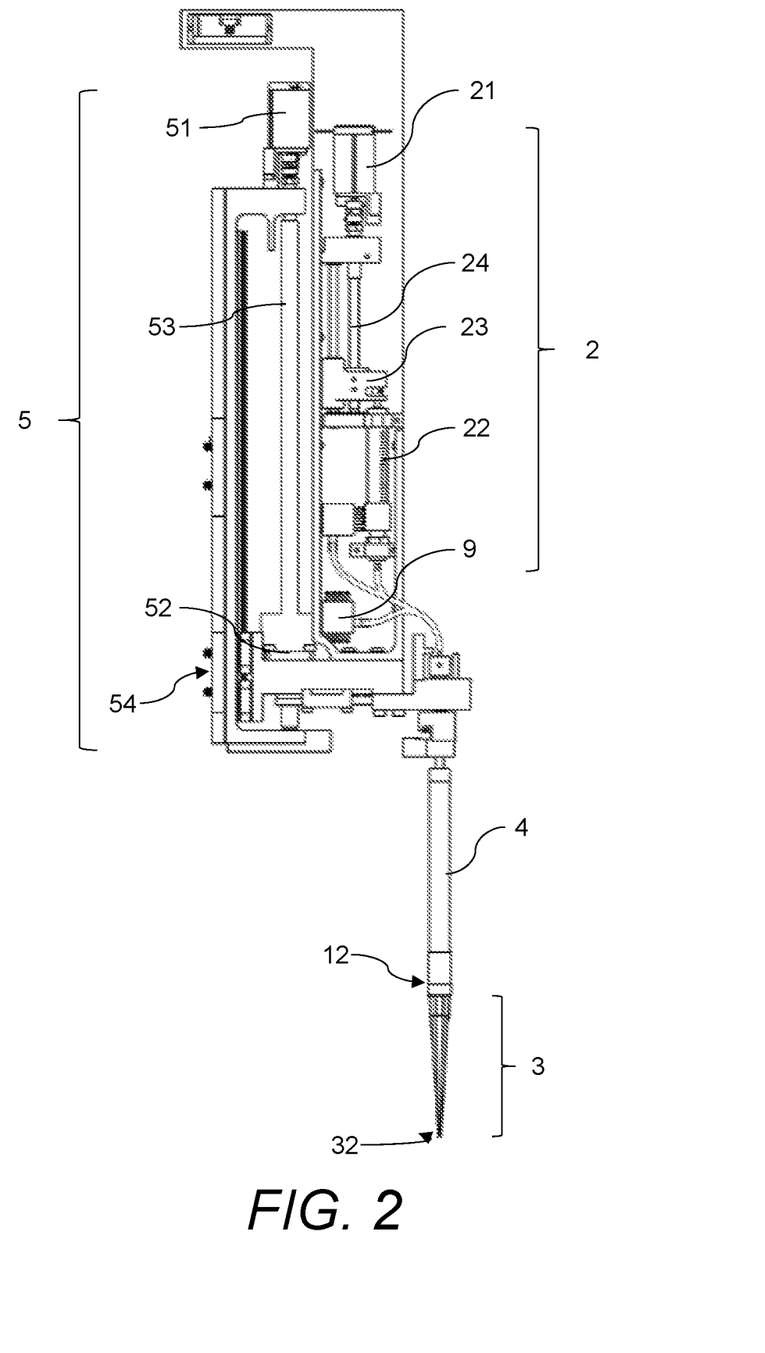
FIG. 2 illustrates a side view of a specific example of one instantiation of the liquid handling apparatus of FIG. 1 that can be used to perform the presently disclosed automatic liquid transfer optimization pipetting method.

Referring now to FIG. 2 is a side view of a specific example of one instantiation of the liquid handling apparatus 1 shown in FIG. 1 that can be used to perform the presently disclosed automatic liquid transfer optimization pipetting method. As illustrated, the liquid handling apparatus 1 includes, but is not limited to, the pump 2, the pipette tip 3 as described above (in FIG. 1) in airtight connection to the conduit 4 leading to the pump 2, the electronic controller 7, the optimization algorithm 8, the pressure sensors 9, and a vertical linear actuator 5 which can move the pump 2 and pipette assembly vertically.

In particular, FIG. 2 shows more details of one example of the pump 2. Namely, in this example, the pump 2 can be a syringe pump that includes, but is not limited to, the motor 21 that drives a lead screw 24, a linear motion guide 23, and the syringe 22. The vertical linear actuator 5 can include, but is not limited to, an actuator motor 51 that drives an actuator lead screw 53, an actuator linear motion guide 52, and all attached to a fixed frame 54 of the liquid handling apparatus 1.

The liquid handling apparatus 1 of FIG. 2 can be connected to an electronic controller 7 in a manner as illustrated in FIG. 1. An electronic controller 7 can, for example, be a general purpose computer, special purpose computer, personal computer, microprocessor, or other programmable data processing apparatus. The electronic controller 7 serves to provide processing capabilities, such as storing, interpreting, and/or executing software instructions, as well as controlling the overall operations of the liquid handling apparatus 1. The electronic controller 7 and/or the optimization algorithm 8 can be capable of, but not limited to, generating signals, receiving signals, processing signals, sending motion commands, and/or processing any information or data in order to perform the electronic functions described herein as well as any other functions.

An air-displacement pipetting device, such as the liquid handling apparatus 1 of FIG. 1 and FIG. 2, can be theoretically modeled as a second-order system including a mass, a capacitance, and a resistance. A second-order system includes two energy storage elements, usually in the form of a spring as the capacitance and the inertia of the mass, and can be modeled with a second-order differential equation. The response of a second-order system depends greatly on the nature of the components in the system, but is an understood phenomenon. For example, a second-order electrical system can include an inductor, a capacitor, and a resistor. In such a system, energy can be stored in the capacitor and in the inductor. In a pipetting device, "mass" refers to the liquid volume within the pipette tip, "capacitance" refers to the compressible air volume between the liquid in the pipette tip and the pump, and "resistance" refers to the restricted flow of fluid through the orifice of the pipette tip. Such a device can store energy in two modes: (1) in the compressible air volume capacitance, and (2) in the inertia of the liquid.

Figure 3A:
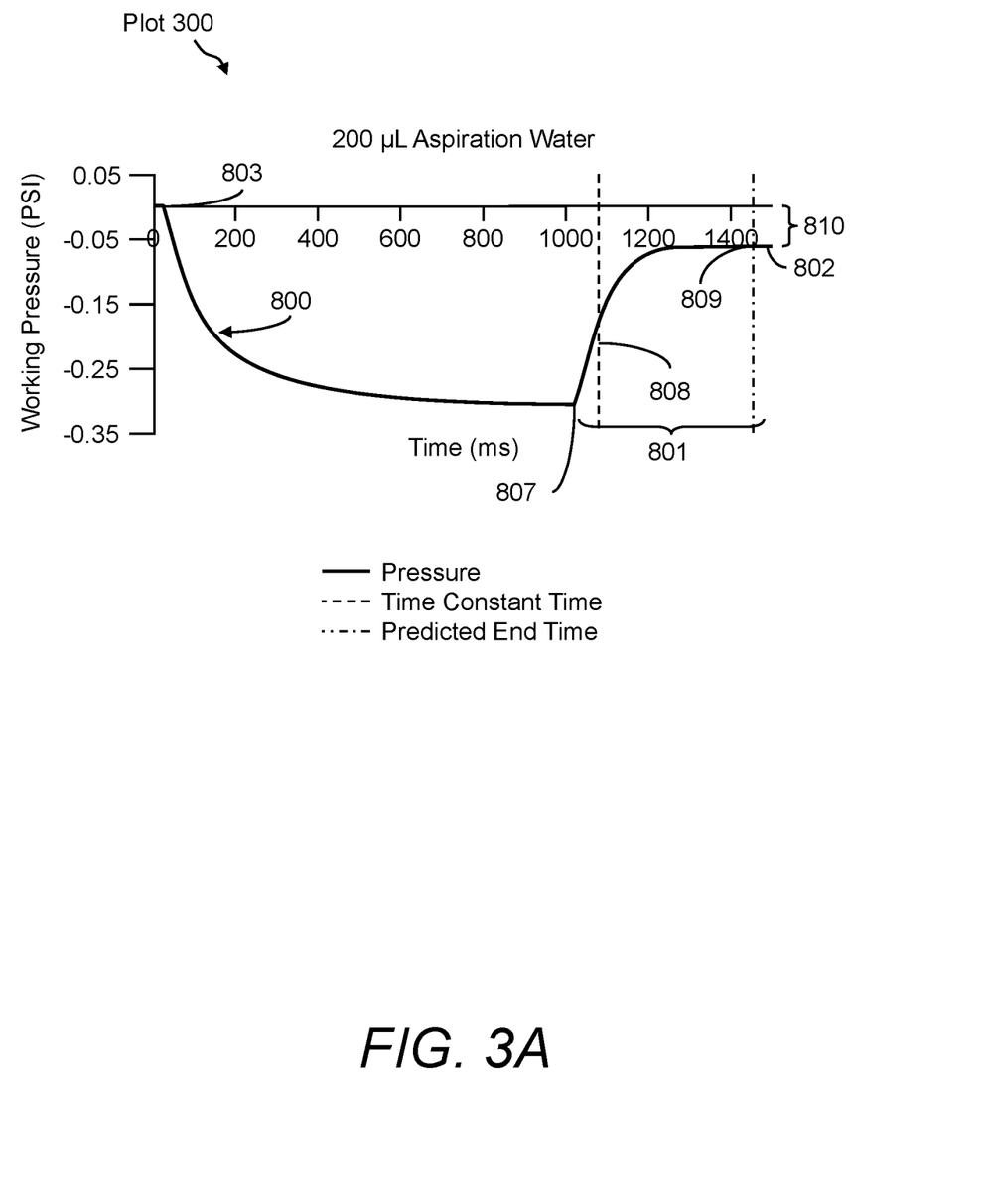
FIG. 3A and FIG. 3B show plots of an example of a measured signal and system response during aspiration of an aqueous solution using the presently disclosed automatic liquid transfer optimization pipetting method.
Figure 3B:
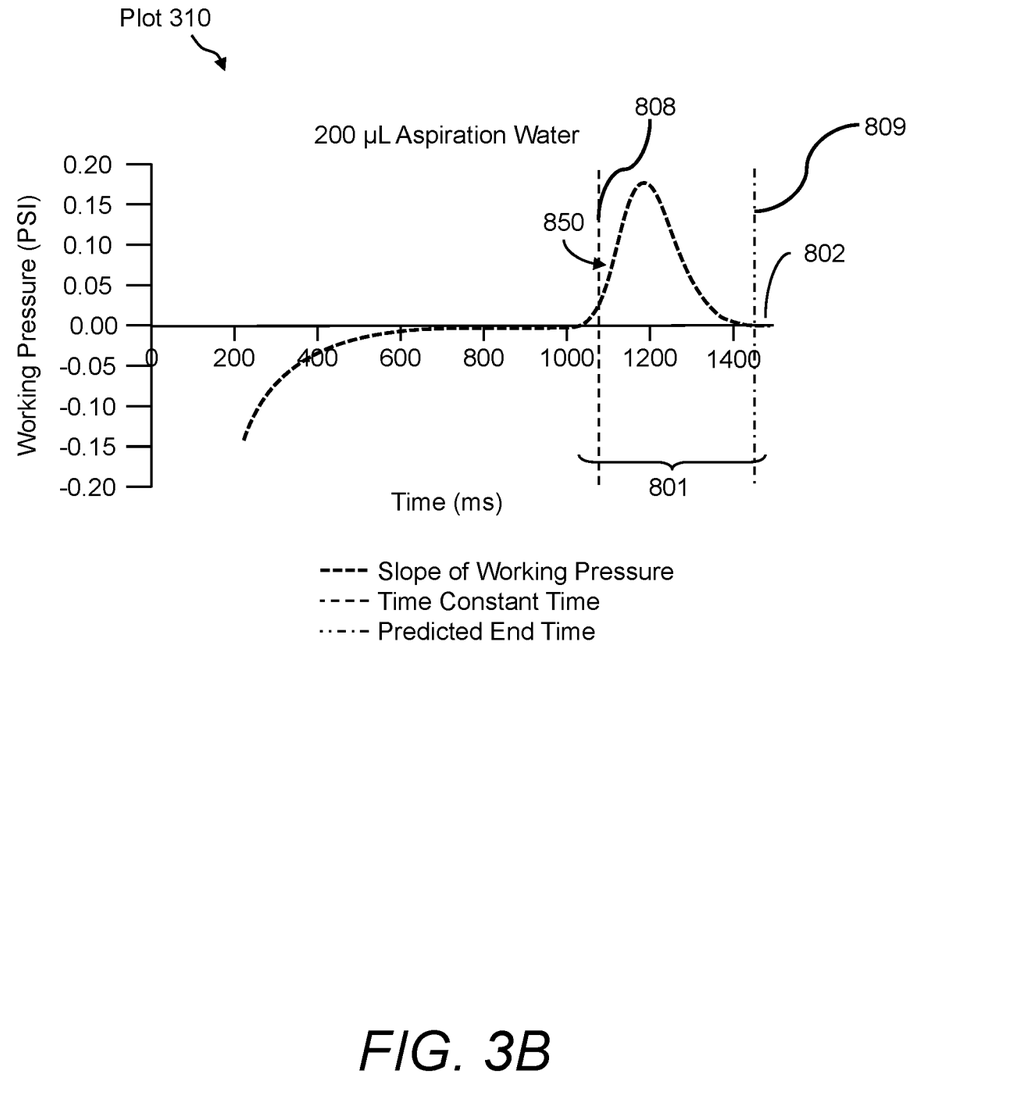
Figure 4:
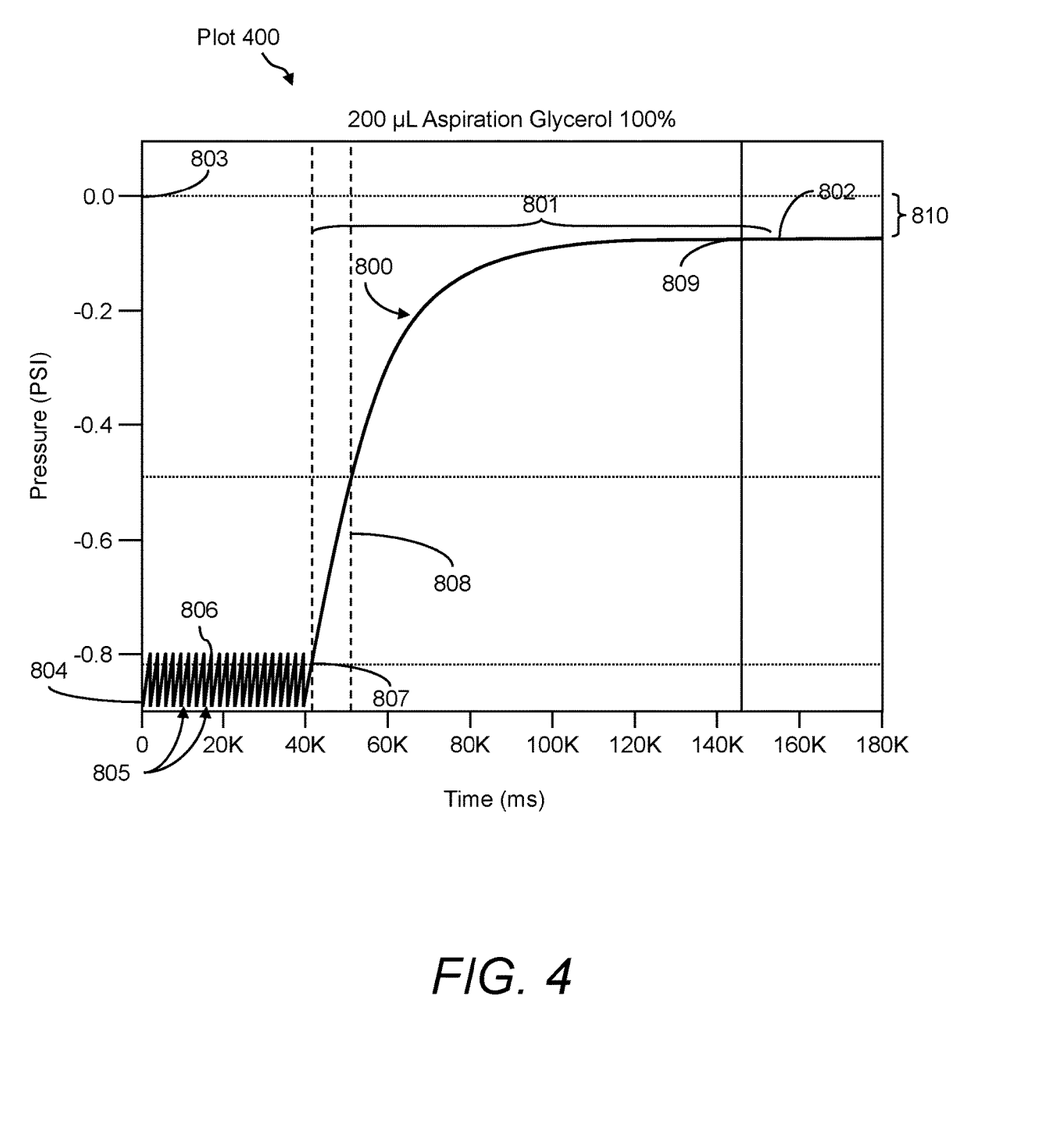
FIG. 4 shows a plot of an example of a measured signal and system response during aspiration of 100% glycerol using the presently disclosed automatic liquid transfer optimization pipetting method.

FIG. 3A, FIG. 3B, and FIG. 4 are plots of examples of a measured pressure response during aspiration of a liquid using the presently disclosed automatic liquid transfer optimization pipetting apparatus (e.g., the liquid handling apparatus 1) and method. More specifically, FIG. 3A shows a plot 300 and FIG. 3B shows a plot 310 of a measured pressure response during aspiration of water, and FIG. 4 shows a plot 400 of a measured pressure response during aspiration of 100% glycerol.

Referring now to the plot 300 of FIG. 3A and plot 400 of FIG. 4, some aspects of the presently disclosed automatic liquid transfer optimization pipetting apparatus (e.g., the liquid handling apparatus 1) and method are explained. Plot 310 of FIG. 3B, will be explained in more detail further below. In FIG. 3A, plot 300 shows a pressure response 800 of the enclosed volume of air during device actuation. After actuation of the syringe pump 2 for the desired volume is completed, the pressure response 800 demonstrates an exponential decay 801 as it returns to the steady state condition 802. Notably, the pressure response 800 settles to the steady state condition 802 with no significant oscillation about the steady state. This result shows that the liquid handling apparatus 1 is an over-damped second-order system, suggesting the effect of the mass inertia (e.g., momentum of the fluid entering or leaving the pipette tip 3) is negligible compared to the effects of the resistance and capacitance. Therefore, the liquid handling apparatus 1 can be modeled more simply as a first-order system including a capacitance and a resistance in the form of the compressible air volume between the liquid 61 in the pipette tip 3 and the restricted flow of fluid through the orifice 32 of the pipette tip 3, respectively. Actuation of the pump 2 can be viewed as input to the first-order system.

For the purpose of describing methods disclosed herein, an aspiration or dispensation of liquid carried out by such a device (i.e., the liquid handling apparatus 1 of FIG. 1 and FIG. 2) can be divided into two phases. During the first phase, the pump 2 is actuated to displace a volume of air in the pipette tip 3, which corresponds to a desired volume of liquid 61 that will move into or out of the pipette tip 3. Due to the compressibility of the air in the conduit 4, the movement of liquid into or out of the pipette tip 3 will lag the actuation of the pump 2. Therefore, at the time pump 2 completes its actuation, the air in the conduit 4 will exist in a compressed or expanded state, having stored energy in the form of pressure or vacuum relative to the ambient pressure outside the instrument, thus causing liquid to continue moving into or out of the pipette tip 3. The second phase begins at this time, upon completion of the pump actuation of the desired volume, and continues until the air pressure in the conduit 4 settles to equilibrium with the air pressure outside the instrument, at which time liquid is no longer moving into or out of the pipette tip 3. At this time the aspiration or dispensation is complete and the pipette tip 3 can be removed from the liquid 61.

The pressure or vacuum of the enclosed air volume in the device relative to the ambient pressure outside the system during a pipetting operation will be referred to herein as the "working pressure." In the specific case of vacuum inside the system relative to outside the system, as during an aspiration, the working pressure will be specified as "negative working pressure." In the specific case of elevated pressure in the system relative to outside the system, as during dispensation, the working pressure will be specified as "positive working pressure."

During the first phase of a pipetting operation, the pump 2 is actuated and a change in working pressure grows in the air volume within conduit 4. If the working pressure is allowed to grow too much, errors can occur resulting in inaccurate pipetted volumes. During aspiration it is possible for the negative working pressure to become so severe that the pressure inside the pipette tip 3 drops below the vapor pressure of the liquid 61 being aspirated, causing the liquid 61 to vaporize and produce gas bubbles in the pipette tip 3. This type of error can be referred to as "cavitation," and results in poor accuracy of transferred volumes. During a dispensation, the liquid 61 inside the pipette tip 3 should be allowed to flow smoothly and cohesively out of the pipette tip 3. If the positive working pressure is too severe, the liquid 61 in the center of the pipette tip 3 can flow faster than the liquid coating the inside walls of the pipette tip 3, causing the pressurized air within the liquid handling apparatus 1 to escape the pipette tip 3 rather than the full desired volume of liquid. This type of error can be referred to as to as "tunneling," which also results in poor accuracy of transferred volumes.

During the first phase of a pipetting operation, some methods disclosed herein relate to limiting the energy stored in the capacitance by limiting the working pressure in the conduit 4, as measured by the pressure sensor 9 during pump actuation, so as not to cause pipetting errors. By limiting the working pressure of the air volume within conduit 4 during the first phase of a pipetting operation, cavitation or tunneling can be avoided regardless of the properties of the liquid 61 being aspirated or dispensed. The working pressure can be limited by adjusting the rate of pump actuation during the first phase of a pipetting operation.

During the second phase of a pipetting operation, some methods disclosed herein relate to predicting and confirming the correct time at which the working pressure settles to equilibrium with ambient pressure outside the liquid handling apparatus 1, which means that liquid is no longer leaving or entering the pipette tip 3 and the pipetting operation is complete. If the pipette tip 3 is removed from the liquid 61 before the working pressure settles to steady state, pipetting volume errors can occur because the total volume of liquid corresponding to the volume actuated by the pump has not been fully aspirated or dispensed from the pipette tip 3. If the pipette tip 3 remains in the liquid 61 for any time after equilibrium has been reached, it reduces the efficiency of the operation. Thus, methods described herein comprise confirming in a timely manner that an equilibrium state has be achieved, so that the execution of the pipetting operation can proceed efficiently.

In some embodiments, a method of limiting the working pressure during the first phase of a pipetting operation is described as follows. In one example and referring now again to plot 300 of FIG. 3A and plot 400 of FIG. 4, a method described herein begins with measurement of a reference pressure 803 ($P_0$) prior to an aspiration or dispensation. For example, a reference pressure 804 can be a pressure in the conduit 4 when there is an absence of liquid in the conduit 4. The reference pressure 803 is measured at a time before the syringe pump 2 is actuated, but can be measured before or after the pipette tip 3 is lowered into the liquid 61. In one embodiment, the reference pressure 803 can be calculated as an average of numerous measurements in order to filter the effects of noise on the signal.

Methods described herein proceed with actuation of the pump 2 to displace a volume of air in the pipette tip 3 associated with the desired volume of liquid to be aspirated or dispensed. The initial control parameters of pump actuation, such as pump rate, are the same for any pipetting operation, regardless of the liquid 61 to be transferred. Preferably, the default control parameters for pump actuation provide a sufficient pump rate to create a substantially measurable change in working pressure during any pipetting operation. In one embodiment, the initial control parameters can be determined based on the volume of liquid to be aspirated or dispensed.

During pump actuation the working pressure within the liquid handling apparatus 1 is monitored. Liquids of lower viscosity will normally have less resistance to flow through the orifice 32 of the pipette tip 3, so the working pressure cannot increase considerably during pump actuation when pipetting such liquids. Liquids of higher viscosity will tend to have more resistance to flow through the opening or orifice 32 of the pipette tip 3, and thus the working pressure can increase to levels that would cause pipetting errors during pump actuation. If the working pressure approaches a predetermined threshold 804 (see plot 400) during pump actuation, the movement of the pump 2 is slowed or stopped to prevent the working pressure from growing to a point at which the errors described above can occur. The actuation of the pump 2 is controlled so that the working pressure does not exceed a predetermined threshold.

In some embodiments, the motion of the pump 2 can be halted entirely when the working pressure reaches the threshold. At a time the pump 2 is halted, e.g., at pump halt time 805 (see plot 400), the working pressure will immediately begin to decay as liquid enters or leaves the pipette tip 3. Actuation of the pump 2 can begin again when the working pressure decays beyond a lower threshold 806 (see plot 400). In some instances, actuation of the pump 2 can be paused and resumed multiple times in order to complete the full actuation of the pump 2 required to deliver the desired volume without exceeding the working pressure upper threshold. The values of the upper and lower thresholds are related to the design of a particular pipetting device and pipette tip 3 and can be empirically determined.

In one example, the velocity of the pump 2 is adjusted by a control loop, which considers working pressure as an input and pump velocity as an output. In this example, if the working pressure approaches the upper threshold during pump actuation, the velocity of the pump 2 is adjusted by the control loop so as to maintain the working pressure at or below the upper threshold. Such a control mode can allow for faster execution of a pipetting operation.

The pump 2 is halted when it has displaced the volume of air required to aspirate or dispense an associated volume of liquid. It is important to note that the pump 2 should never be actuated to displace more volume than that associated with the desired volume of liquid to be aspirated or dispensed.

The second phase of a pipetting operation begins at a time when the pump 2 completes its actuation for the desired volume, e.g., at a pump actuation completion time 807. The halting of the pump actuation is a change of input to the first-order system, adjusting input from some positive or negative value to zero. If the pump motion is halted with sufficient deceleration, the change in input can be estimated as a step input. The response of a first-order system to a step input is characterized by the time constant parameter, a principle understood in the study of signals and energy system models. The time constant is a period of time that describes the speed with which a system responds to a change of input. The time constant is typically considered as the period of time required for a system to reach 63.2% (equal to 1−1/e) of the steady state response after a step input to the system. A period of 5 time constants is regarded as the time required for a pure first-order system to reach 99.3% of the steady state response, at which point the system can generally be regarded as having achieved steady state. Thus, if the time constant of a first-order system response to a step input can be determined in real time, the time required for the system to reach steady state can be reasonably predicted. The time constant can be determined in real time if the magnitude of the change in system response to a step input is known. The magnitude of change in system response to a step input from a positive or negative value to zero can be determined as the difference between the system response measured just before a step input and a known steady state equilibrium response to zero input.

During a pipetting operation, beginning at the time the pump 2 stops actuation, the working pressure decays in an exponential fashion (i.e., exponential decay 801) as it returns to steady state condition 802. In some methods disclosed herein, a time constant of this pressure response in exponential decay is determined in real time in order to predict the time required to reach steady state condition 802, at which point the aspiration or dispense is considered complete. This is possible because the magnitude in change in working pressure can be determined using the reference pressure 803 ($P_0$), measured before the pipetting operation began, as the equilibrium value and by using the working pressure measured at the time the pump 2 stops actuation as the initial value of the characteristic first-order response. By measuring the time constant of this decaying pressure response, the time at which the response settles to steady state equilibrium can be extrapolated. In this way, regardless of the properties of the liquid 61 being aspirated or dispensed, the pressure response provides enough information to predict when the pipetting operation will be complete.

In the case of the liquid handling apparatus 1, a variety of factors can affect the exponential decay of the pressure response during the second phase of an aspiration or dispense. The main factors include the properties of the liquid 61 to be aspirated or dispensed, the geometry and design of the pipetting apparatus, and the geometry and design of the pipette tip 3. Some factors can have minor effects that vary between pipetting operations, such as the volume of liquid in the pipette tip 3 at any given time. Environmental factors external to the liquid handling apparatus 1, such as temperature, ambient pressure, and humidity, can also influence the pressure response. A unique consideration of the pipetting system, when considered as a first-order system, is residual vacuum of the enclosed air volume 810 when liquid exists in the pipette tip 3 at steady state condition 802. If liquid is in the pipette tip 3 at steady state equilibrium, for example after an aspiration operation, a slight negative working pressure (i.e. a vacuum relative to ambient pressure outside the pipette tip 3) exists in the liquid handling apparatus 1 at steady state, which retains the liquid 61 in the pipette tip 3. The magnitude of this residual vacuum depends on the volume of liquid in the pipette tip 3, the density of that liquid, and the design of the pipette tip 3, and the volume of air inside the liquid handling apparatus 1. Thus, the residual vacuum and the magnitude of the final steady state response can vary from operation to operation.

Because of the unique considerations of the liquid handling apparatus 1, in one embodiment the time constant ($\tau$) is modified from its generally accepted definition to suit the characteristics of a particular pipetting system design. In one example, the time constant is defined as the period of time required for the pressure response to reach 40% of the steady state response. For the purposes of calculating the working pressure after a period of one time constant, steady state is considered equal to the ambient reference pressure measured before the operation. In one example, at the time the syringe piston completes its motion for the desired volume (at pump actuation completion time 807), the working pressure measurement is recorded as $P_1$ and the time is recorded as $t_1$. The working pressure level after a time period of one time constant ($P_\tau$) is calculated by:

$$P_\tau = P_1 - 0.4 \ast (P_1 - P_0)$$

Where
  $P_0$ is the reference pressure measured before pump actuation (the reference pressure 803) and
  $P_1$ is the pressure measured at the end of pump actuation and beginning of exponential decay 801 of the working pressure.

The working pressure is continuously monitored as it decays (exponential decay 801) until the value of $P_\tau$ is reached, at which point the time is recorded as $t_\tau$ 808. The time constant $\tau$ is then calculated as the difference between $t_1$ and $t_\tau$:

$$\tau = t_\tau - t_1$$

In one example, the multiple of time constant periods to pass before steady state is achieved after a step input must be modified along with the time constant definition to suit the characteristics of a particular pipetting system design. Continuing the example above, with a time constant determined at 40% decay to steady state, steady state can be achieved after a period of 10 time constants, in a system in accordance with one embodiment. The parameters of the time constant definition and the multiple of time constants to reach steady state are bound to each other and can vary based on system design. These parameters can be determined empirically.

Because of the numerous mentioned influences on the system, the pressure response can vary slightly from operation to operation even for the same liquid aspirated with the same control parameters. To overcome this aspect and improve the reliability of the disclosed method, the steady state prediction can be confirmed by monitoring the rate of change of the pressure response over time. In one example, the pressure response rate of change is calculated over a certain time interval. The rate of change, s, is calculated as follows by dividing the difference in pressure before and after each time interval by the duration of the time interval.

$$s = \frac{P_n - P_{n-1}}{t_s}$$

Where
s is the rate of change of the pressure response,
P is the pressure measured at a particular interval of time,
n is the number of time intervals that have passed since the beginning of pressure response rate of change measurement, and
$t_s$ is the rate of change interval of time.

In one example, when the rate of change of the pressure response falls below a threshold, meaning the pressure response is changing very little over a period of time, the system can be confirmed to have reached steady state. Thus, in accordance with one embodiment of the presently disclosed method, two conditions must be met to ensure completion of the pipetting operation: the system must wait a period of 10 time constants after pump actuation completion time 807, and the system must confirm the pressure response has settled to steady state condition 802 by waiting until the rate of change of the pressure response has fallen below a threshold. FIG. 3B illustrates this principle, where curve 850 in plot 310 shows the slope of the working pressure calculated by the system throughout the same 200 uL aspiration of water shown in plot 300 of FIG. 3A. Plot 310 of FIG. 3B is synchronized with plot 300 of FIG. 3A, and illustrates the features of the slope (rate of change) response with relation to key parameters such as the time constant time 808, predicted end time 809, and confirmed end time 802. The confirmed end time 802 is determined from this slope measurement, when the slope falls below a certain threshold. Additionally, in one example, the measurements from the pressure sensors 9 are filtered by calculating a moving average of the pressure sensor signal. Preferably, pressure measurements from the pressure sensors 9 are made continuously at a constant data rate. The moving average is determined by calculating the average of all previous measurements within a certain window of time of the present measurement. Preferably, the output of the filtered pressure signal is the pressure value considered in the pressure response rate-of-change calculation above.

In one example, the above described parameters (e.g., the time window of the moving average filter, the time interval of the pressure response rate of change calculation, and the pressure response rate of change threshold to confirm steady state) are determined as functions of the time constant τ. This enables the optimal system response regardless of the properties of the liquid 61 being aspirated or dispensed. For example, a very viscous liquid will have a relatively long time constant and an associated very long exponential decay to steady state. Near the end of this decay, the pressure response will change very slowly, so the rate of change must be measured over a long period of time in order to gain sufficient resolution. In comparison, an aqueous solution will have a relatively short time constant and will settle to steady state very quickly, perhaps faster than the period of time over which the rate of change is measured for a viscous liquid. If the optimal parameters of the viscous liquid aspiration were used to determine steady state for an aqueous solution aspiration, the operation would not be very efficient. If the optimal parameters of the aqueous solution aspiration, which include a short period of time over which the rate of change is measured, were used to determine steady state for a viscous liquid, the steady state might be mistakenly determined very early resulting in an inaccurate pipetting result.

In one example, the above described parameters are determined as linear functions of the time constant τ with empirically determined coefficients. The coefficients can be calibrated for a specific system design, and are dependent upon factors including the volume of air between the pump 2 and the pipette tip 3, the size and design of the pipette tip 3, and parameters of the pump actuation. The above parameters are calculated by:

$$t_f = c_1 * \tau + c_2$$

$$t_s = c_3 * \tau + c_4$$

$$s_0 = c_5 * \tau + c_6$$

Where
$t_f$ is moving average filter time window,
$t_s$ is the pressure response rate of change determination time interval,
$s_0$ is the pressure response rate of change threshold for steady state, and
$c_1$, $c_2$, $c_3$, $c_4$, $c_5$, and $c_6$ are empirically determined coefficients specific to a particular pipetting system design.

In some embodiments, additional control parameters can be derived from the time constant in a manner similar to those described above, such as speed of pipette tip 3 removal from the liquid 61 after the steady state response has been reached. Further, in some embodiments, control parameters for the dispensation operation can be derived from the time constant determined during the associated aspiration operation.

Figure 5:
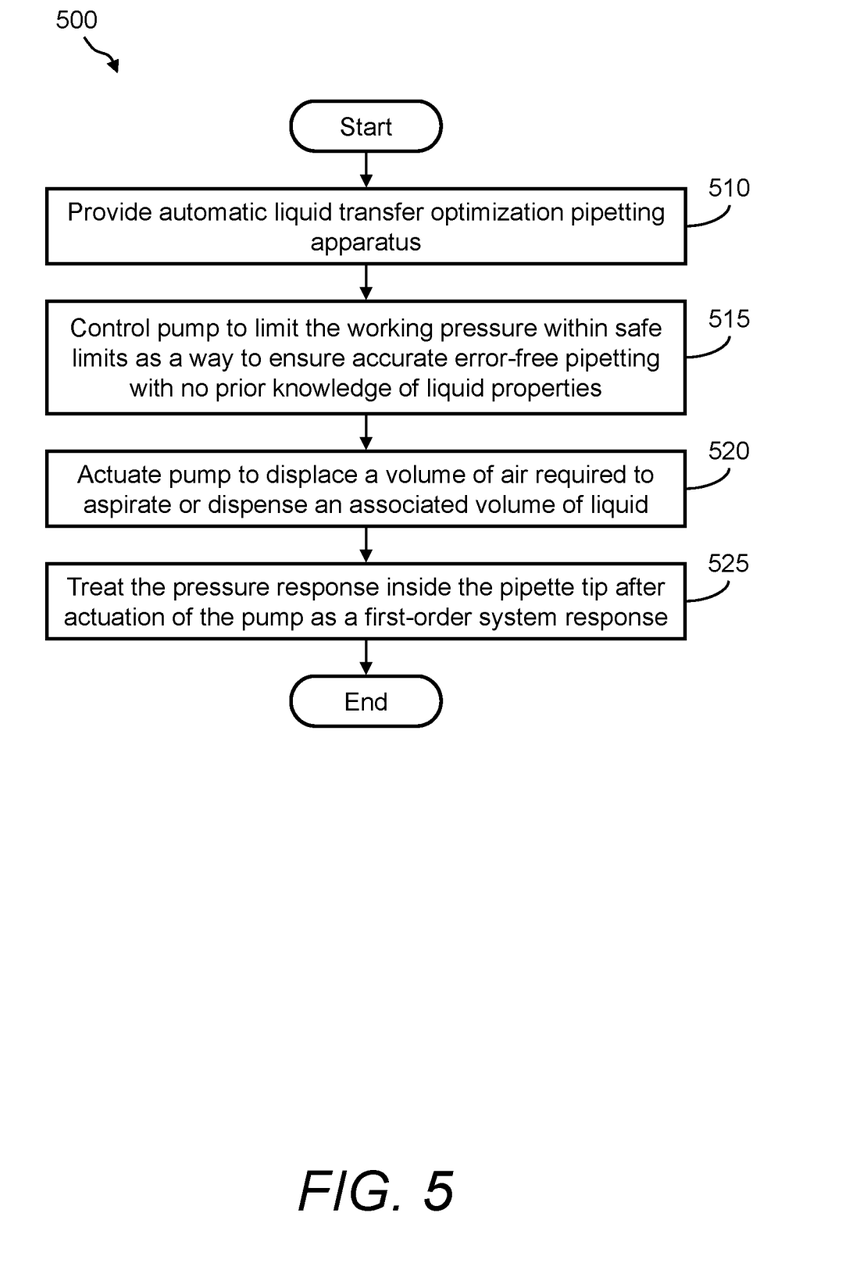
FIG. 5 illustrates a flow diagram of an example of a general method of automatic liquid transfer optimization pipetting using the presently disclosed liquid handling apparatus.

Referring now to FIG. 5, a flow diagram of an example of a method 500 of automatic liquid transfer optimization pipetting is described using the presently disclosed the liquid handling apparatus 1, according to a simple configuration. The method 500 can be used to emulate and optimize the way a human would operate a manual pipette. The method 500 can include, but is not limited to, the following steps.

At a step 510, an automatic liquid transfer optimization pipetting apparatus is provided. For example, the liquid handling apparatus 1 shown in FIG. 1 and/or FIG. 2 is provided.

At a step 515, using the electronic controller 7 and/or the optimization algorithm 8, pump 2 is controlled to limit the working pressure within safe limits as a way to ensure accurate error-free pipetting with no prior knowledge of liquid properties.

At a step 520, using the electronic controller 7 and/or the optimization algorithm 8, pump 2 is actuated to displace a volume of air required to aspirate or dispense an associated volume of liquid.

At a step 525, using the electronic controller 7 and/or the optimization algorithm 8, the pressure response inside the pipette tip 3 after actuation of the pump 2 is treated as a first-order system response. Namely, a prediction of end time is made based on the time constant value, which is determined "on the fly," and the prediction is confirmed when the rate of change of the pressure response falls below a certain threshold. The parameters for measuring the rate of change and the associated threshold are determined as a function of the time constant value.

Figure 6:
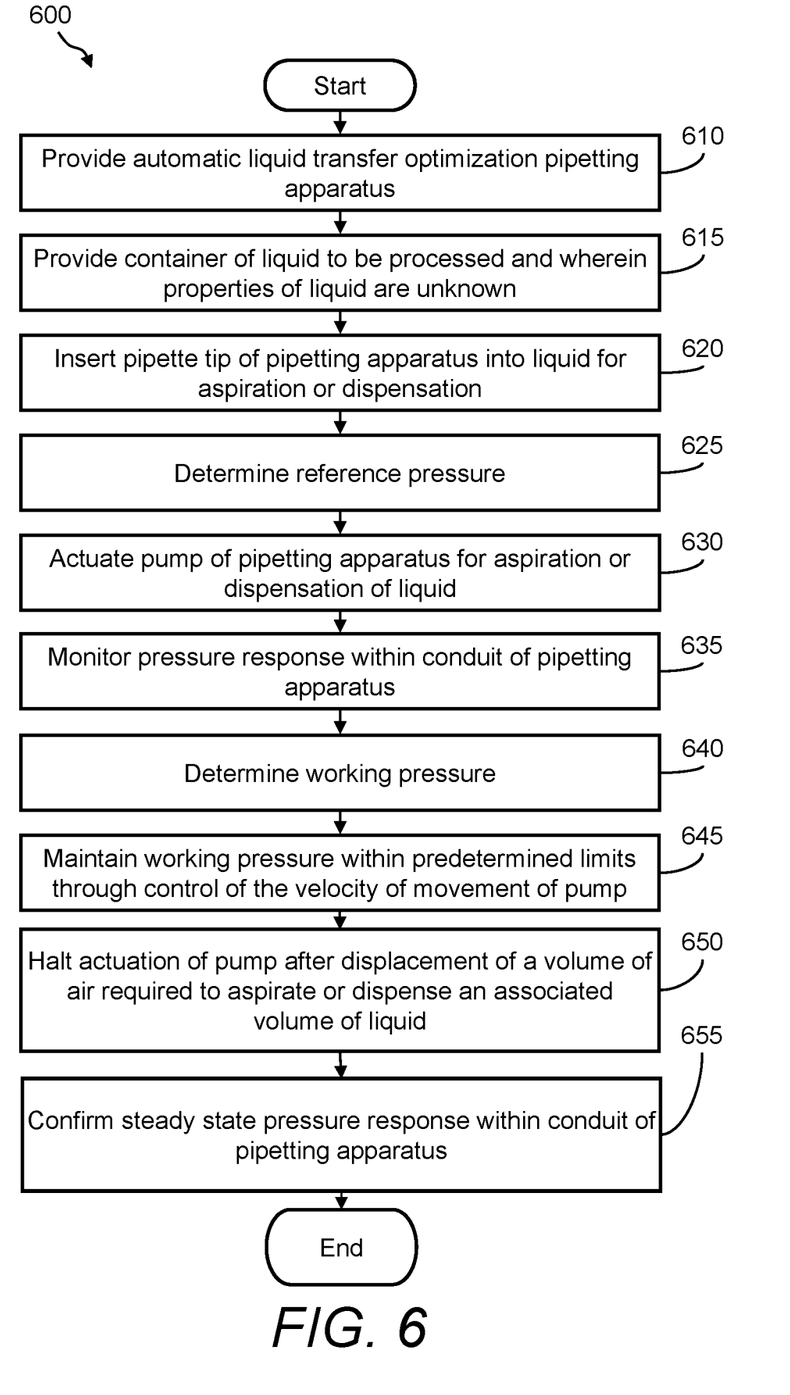
FIG. 6 illustrates a flow diagram of an example of a specific method of automatic liquid transfer optimization pipetting using the presently disclosed liquid handling apparatus.

Referring now to FIG. 6, a flow diagram of a method 600 describes a specific method of automatic liquid transfer optimization pipetting using a liquid handling apparatus 1 described herein. The method 600 can include, but is not limited to, the following steps.

At a step 610, an automatic liquid transfer optimization pipetting apparatus is provided. For example, the liquid handling apparatus 1 shown in FIG. 1 and/or FIG. 2 is provided.

At a step 615, a container of liquid to be processed is provided and wherein properties of the liquid are unknown. For example, the container 6 is provided that is holding a quantity of the liquid 61, wherein the physical properties of the liquid 61 are unknown.

At a step 620, the pipette tip of the automatic liquid transfer optimization pipetting apparatus is inserted into the liquid for aspiration or dispensation. For example, under the control of the electronic controller 7 and/or the optimization algorithm 8, the pipette tip 3 of the liquid handling apparatus 1 is inserted into the liquid 61 for aspiration or dispensation.

At a step 625, a reference pressure is determined. For example, using the electronic controller 7 and/or the optimization algorithm 8, a reference pressure is determined prior to aspiration or dispensation of the liquid 61, wherein the reference pressure is equal to the ambient pressure within the conduit 4 and outside the conduit 4 before any aspiration or dispensation operations.

At a step 630, a pump of the automatic liquid transfer optimization pipetting apparatus is actuated for aspiration or dispensation of the liquid. For example, under the control of the electronic controller 7 and/or the optimization algorithm 8, the pump 2 of the liquid handling apparatus 1 is actuated for aspiration or dispensation of the liquid 61. More specifically, when the pump 2 is a syringe pump, the piston of the syringe pump is moved outward (i.e., away from the pipette tip 3) during an aspiration, and wherein the piston of the syringe pump is moved inward (i.e., toward the pipette tip 3) during a dispensation. Further, in this step, pump actuation is done at a sufficient speed to create a substantially measureable pressure change within the conduit 4.

At a step 635, the pressure response within a conduit is monitored. For example, the electronic controller 7 and/or the optimization algorithm 8 are used to monitor readings from the pressure sensors 9 and thereby monitor the pressure response within the conduit 4 of the liquid handling apparatus 1.

At a step 640, a working pressure of the automatic liquid transfer optimization pipetting apparatus is determined. For example, using the electronic controller 7 and/or the optimization algorithm 8, a working pressure of the conduit 4 of the liquid handling apparatus 1 is determined.

At a step 645, the working pressure is maintained within predetermined limits through the control of a velocity of movement of the pump of the automatic liquid transfer optimization pipetting apparatus. For example, under the control of the electronic controller 7 and/or the optimization algorithm 8, the working pressure in the conduit 4 is maintained within predetermined limits through the control of the velocity of movement of the pump 2 of the liquid handling apparatus 1.

At a step 650, actuation of the pump is halted after displacement of a volume of air required to aspirate or dispense an associated volume of liquid. For example, under the control of the electronic controller 7 and/or the optimization algorithm 8, actuation of the pump 2 is halted when the pump 2 has displaced a volume of air in the pipette tip 3 that corresponds to a desired volume of the liquid 61 that is being aspirated or dispensed. Thus, when actuation of the pump 2 stops, liquid may still be aspirated or dispensed until equilibrium (i.e. steady state) is reached. Further, halting of the pump actuation is done with sufficient deceleration of the velocity of the pump 2 to act as a step input to create a substantially measurable first-order response to the working pressure.

At a step 655, the steady state pressure response within the conduit of the automatic liquid transfer optimization pipetting apparatus is confirmed. For example, using the electronic controller 7 and/or the optimization algorithm 8, the steady state pressure response within the conduit 4 of the liquid handling apparatus 1 is confirmed by measuring the slope of the pressure response over time.

Referring now again to FIG. 5 and FIG. 6, throughout the steps of the method 500 and/or the method 600 of automatic liquid transfer optimization pipetting, the liquid transfer process is monitored and automatically adjusted by the electronic controller 7 and/or the optimization algorithm 8 to ensure error-free operation and to predict and confirm the time needed to finish the process for maximum accuracy, precision, and efficiency. By utilizing the pressure response rate of change to confirm the steady state at the end of the process, the method is less susceptible to variations caused by environmental conditions, normal differences in fluid properties, and physical variance of system components.

The presently disclosed liquid handling apparatus 1 and the methods 500, 600 can in some embodiments simplify the user experience of automated pipetting devices and lower the barrier to entry for use of automated pipetting devices by enabling such devices to pipette any liquid without prior knowledge of the liquid properties. For example, as compared with conventional automated liquid handling instruments, the presently disclosed liquid handling apparatus 1 and the methods 500, 600 provide a means to reduce or entirely eliminate (1) the need to specify liquid properties when programming an automated liquid handler, and (2) the need to calibrate pipetting parameters for each specific liquid to be processed.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" cannot expressly appear with the value, amount or range. Accordingly, unless indicated to the contrary, the numerical parameters set forth in the following specification and attached claims are not and need not be exact, but can be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

The invention claimed is:

1. A method of automatic liquid transfer optimization pipetting, comprising:
   providing an apparatus; comprising
      a pump;
      a pipette tip in fluid communication with the pump, the pipette tip comprising a conduit with a working air pressure relative to ambient pressure, the working air pressure having an upper threshold;
      a pressure sensor connected to the conduit, the pressure sensor being adapted to measure the working air pressure, the ambient pressure, and changes to the working air pressure caused by aspiration or dispensation of a liquid by the pipette tip; and
      a controller in electrical communication with the pump and the pressure sensor, wherein the controller receives input from the pressure sensor, commands a velocity of the pump, and maintains the working air pressure at or below the upper threshold by adjustment of the velocity of the pump during aspiration or dispensation of a liquid by the pipette tip,
   aspirating or dispensing a liquid in the conduit of the pipette tip;
   adjusting a velocity of the pump to limit the working pressure in the conduit of the pipette tip to a pressure level equal to or less than a maximum working pressure value during aspiration or dispensing of the liquid; actuating pump to displace a volume of air in the conduit, the volume of air corresponding to a desired volume of the liquid being aspirated or dispensed.

2. The method of claim 1, further comprising:
   providing a container holding the liquid, the liquid having unknown physical properties; and
   inserting the pipette tip into the liquid for aspiration or dispensation.

3. The method of claim 1, further comprising determining a reference pressure in the conduit, the reference pressure being a pressure in the conduit during an absence of any liquid in the conduit.

4. The method of claim 3, wherein the reference pressure is equal to an ambient pressure within the conduit and outside the conduit.

5. The method of claim 1, wherein aspirating or dispensing the liquid comprises actuating the pump.

6. The method of claim 1, further comprising monitoring pressure within the conduit with the pressure sensor.

7. The method of claim 6, further comprising the step of filtering the measurements by the pressure sensor by calculating a moving average of the pressure sensor signals.

8. The method of claim 7, wherein the moving average is determined by calculating the average of all prior measurements within a period of time.

9. The method of claim 1, wherein the controller adjusts the velocity of the pump during actuation to maintain the working pressure in the conduit at a pressure level equal to or less that the maximum working pressure.

10. The method of claim 1, further comprising confirming a steady state pressure response within the conduit after the pump has been actuated to displace the volume of air in the conduit.

11. The method of claim 10, wherein confirming the steady state pressure response comprises measuring the slope of the pressure response over time.

12. The method of claim 11, wherein the slope is calculated by dividing the difference in pressure before and after a time interval by the duration of the time interval, using the formula:

$$s = \frac{P_n - P_{n-1}}{t_s}$$

wherein s is the slope (time rate of change) of the pressure response, n is the number of time intervals that have passed since the beginning of slope measurement, P is the pressure, and ts is the slope interval of time.

13. The method of claim 1, wherein the pump comprises a syringe and a piston, and wherein actuating the pump comprises moving the piston outward from the syringe during an aspiration, and moving the piston into the syringe during a dispensation.

14. The method of claim 1, wherein the actuating step is done at a sufficient speed to create a substantially measureable pressure change within the conduit.

15. The method of claim 1, wherein the working pressure after a period of exponential decay of one time constant is calculated as:

$$Rt = Pi - 0.4*(Pi - Po)$$

wherein Rt is the working pressure, Po is the reference pressure, and Pi is the pressure at the end of the piston movement and the beginning of the exponential decay.

16. The method of claim 15, further comprising the step of continuously monitoring the working pressure as the working pressure decays until the value of the Rt is reached.

17. The method as recited in claim 1, wherein termination of the pump actuation is with a deceleration of the velocity of the pump that acts as a step input to create a substantially measurable first-order response to the working pressure.

18. The method of claim 1, further comprising the step of determining parameters to adapt the liquid to the pipetting apparatus.

19. The method of claim 18, wherein the parameters are parameters are calculated by:

$$tf = ci*t + C2$$

$$ts = C3*t + C4$$

$$so = C5*t + C6$$

wherein tf is filtering moving average time window, ts is the slope determination time window, so is the slope threshold for steady state, and ci, a, C3, C4, cs, and C6 are empirically determined coefficients specific to a particular pipetting system design.

* * * * *